Feb. 5, 1952 L. G. POLLARD 2,584,398

COMBINED FACSIMILE TRANSMITTING AND RECEIVING EQUIPMENT

Filed May 29, 1948 7 Sheets-Sheet 1

INVENTOR.
L. G. POLLARD

BY

M. J. Reynolds
ATTORNEY

Feb. 5, 1952 L. G. POLLARD 2,584,398

COMBINED FACSIMILE TRANSMITTING AND RECEIVING EQUIPMENT

Filed May 29, 1948 7 Sheets-Sheet 2

INVENTOR.
L. G. POLLARD

BY

M. J. Reynolds

ATTORNEY

Feb. 5, 1952 L. G. POLLARD 2,584,398

COMBINED FACSIMILE TRANSMITTING AND RECEIVING EQUIPMENT

Filed May 29, 1948 7 Sheets-Sheet 3

INVENTOR.
L. G. POLLARD

BY

M. J. Reynolds
ATTORNEY

Feb. 5, 1952 L. G. POLLARD 2,584,398

COMBINED FACSIMILE TRANSMITTING AND RECEIVING EQUIPMENT

Filed May 29, 1948 7 Sheets-Sheet 4

INVENTOR.
L. G. POLLARD

BY

ATTORNEY

Feb. 5, 1952 L. G. POLLARD 2,584,398

COMBINED FACSIMILE TRANSMITTING AND RECEIVING EQUIPMENT

Filed May 29, 1948 7 Sheets-Sheet 5

INVENTOR.
L.G. POLLARD

BY

ATTORNEY

COMBINED FACSIMILE TRANSMITTING AND RECEIVING EQUIPMENT

Filed May 29, 1948 7 Sheets-Sheet 6

INVENTOR.
L. G. POLLARD
BY
M. J. Reynolds
ATTORNEY

COMBINED FACSIMILE TRANSMITTING AND RECEIVING EQUIPMENT

Filed May 29, 1948 7 Sheets-Sheet 7

INVENTOR.
L. G. POLLARD

BY

ATTORNEY

Patented Feb. 5, 1952

2,584,398

UNITED STATES PATENT OFFICE 2,584,398

COMBINED FACSIMILE TRANSMITTING AND RECEIVING EQUIPMENT

Leon G. Pollard, Southampton, N. Y., assignor to The Western Union Telegraph Company, New York, N. Y., a corporation of New York Application May 29, 1948, Serial No. 30,073

29 Claims. (Cl. 178—6.6)

This invention relates to facsimile transmitting and receiving equipment and more particularly to a combined facsimile transmitting and recording machine and to a system for interconnecting two or more of such transmitter-receivers for intercommunication therebetween.

The machine and system of the present invention is particularly useful for the transmission of written intelligence between two or more points such as are usually served by oral or other local intercommunication systems, as for instance, the linking of a teller in a bank with the bookkeeping department, or for connecting a ticket clerk with the reservation department in railroad stations and airline offices.

One of the objects of the present invention is to provide a facsimile transmitter-receiver which will utilize the same record medium for both transmission and reception of facsimile messages.

Another object is to provide a machine of the above nature in which the same scanning mechanism is employed for both transmission and reception of messages.

A still further object is to provide a facsimile transmitter-receiver in which both transmission and reception of the facsimile message is effected by direct conduction of current through a record medium.

Another object is to provide a facsimile transmitter employing a continuous record tape arranged to permit the inscription on a predetermined length thereof, of a message for transmission and having scanning means capable of scanning said predetermined length of tape to transmit the inscribed message.

A further object is to provide a system of communicating over a line circuit in either direction between two or more facsimile transmitter-receivers, in which any transmitter-receiver may seize the line for transmission, initiate another transmitter-receiver into operation as a receiver and transmit facsimile message signals thereto.

Other objects and advantages will hereinafter appear.

The transmitter-receiver of the present invention employs as a record medium, for both transmission and recording, a tape of electrosensitive recording paper of the nature described in the U. S. Patent to Kline, No. 2,251,742. Briefly, this record medium consists of a base of conducting paper, such as a carbon bearing paper, coated with a dielectric layer of a masking medium or pigment, such as lead thiosulphate. This paper has the property of being marked when an electric current from a scanning stylus is passed therethrough and is widely used as a facsimile receiving blank. It has the further property, when marked by an ordinary soft lead pencil of becoming electrically conducting through the dielectric layer in those areas where the pencil markings occur, and may thus serve as a transmitting medium when scanned by a stylus arranged in an electric circuit. This is due to the fact that the dielectric coating is ruptured by the pressure of the pencil and graphite from the pencil embedded in the coating forms a low resistance path through the coating to the conducting paper base. The same stylus, by proper circuit adjustments, may therefore be employed for both transmitting from this record medium or recording upon it.

In accordance with the present invention a roll of narrow tape of the above-described electrosensitive paper is supported in a manner to be fed across a horizontal guideway which serves as a table whereby messages for transmission may be inscribed upon the tape by pencil. The transmitter-recorder is preferably provided with a casing having an opening which gives access to the tape for this purpose. A pivoted cover plate normally closing this opening is arranged to operate control switches so that when the cover plate is opened for the inscription of a message the distant machine will be seized over the connecting line and the cover plate of the distant transmitter-recorder will be locked in closed position so that the distant machine can operate only as a receiver.

After a message has been inscribed upon the tape by the operator the cover plate of the transmitting machine is closed and automatically locked in this position. In closed position it operates a switch to initiate transmission of the inscribed message and at the same time to transmit a control signal to the receiving machine to initiate the latter into operation as a receiver. Individual timing mechanism is provided for each machine to terminate the operation thereof, unlock its cover plate and restore the control circuits to normal after predetermined lengths of message transmitting tape and receiving tape have been scanned by the respective machines.

The same scanning mechanism is used both for transmission and recordation. The tape as it is advanced, by means of suitable feed mechanism, from off the writing table or support is curved transversely into arcuate form and at the zone of curvature is traversed by a rotating disk which supports a plurality of equally spaced styli adapted to contact the paper tape in successive transverse scanning lines.

The closing of the cover of the machine which is serving as a transmitter is effective to control the application of an electrical potential to its revolving styli so as to generate marking pulses in accordance with the conductive areas of the tape, as produced by the pencil markings thereon. These pulses are used to modulate a suitable carrier current which is then amplified and transmitted over the line circuit to the receiving machine. At the receiving station the incoming signal modulated carrier is amplified, and applied to the styli of the receiving machine to mark the tape thereof in accordance with the transmitted signals.

The invention will be more fully understood by reference to the accompanying drawings in which.

Figure 2:
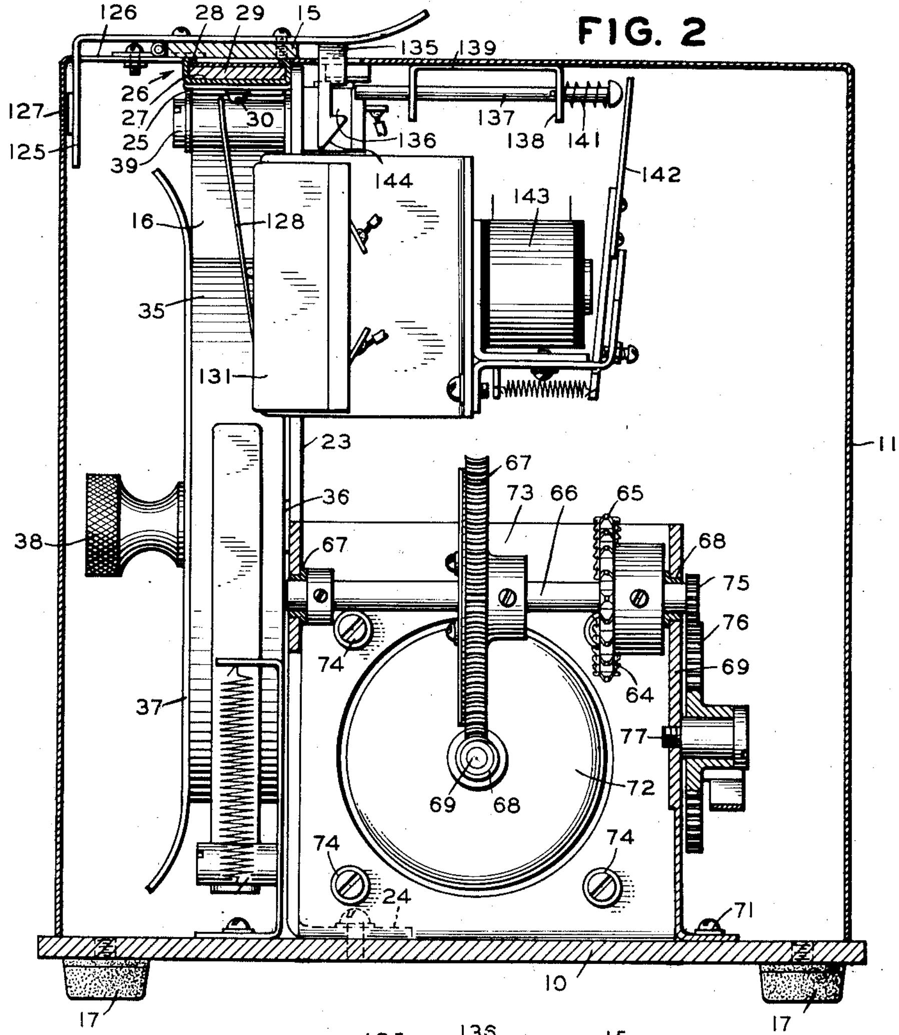
Fig. 2 is a vertical transverse section on the line 2—2 of Fig. 3.
Figure 1:
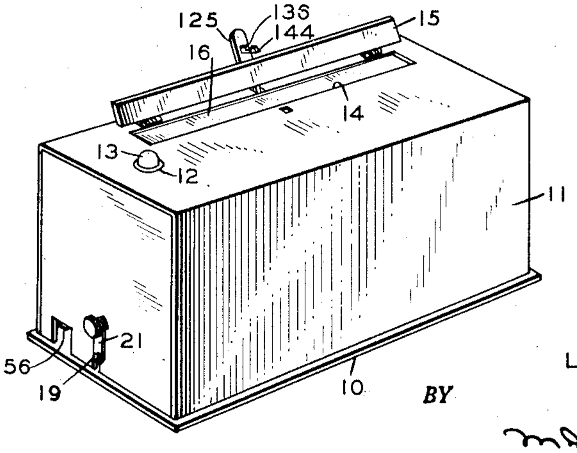
Fig. 1 is a perspective view showing a combined transmitter-receiver with the cover plate open in message inscribing position.

Referring first to Fig. 1, which shows an outside view of the combined transmitter-recorder, the operating mechanism hereinafter to be described is mounted upon a base plate 10 and is enclosed within an open bottom rectangular casing 11. The casing 11 has in its upper face an opening 12 through which a signal lamp 13 protrudes and is further provided with an elongated open slot 14 normally closed by a hinged cover 15. The cover 15 may be raised to the open position shown in Fig. 1 to permit writing upon a record tape 16 disposed along the length of the slot as will hereinafter more fully appear. The control arrangements are such that in transmitting a message the operator need only raise the cover 15, inscribe the message in pencil upon the tape 16 and reclose the cover 15, whereupon the message is automatically transmitted to and recorded upon a similar machine at a distant station.

Figure 3:
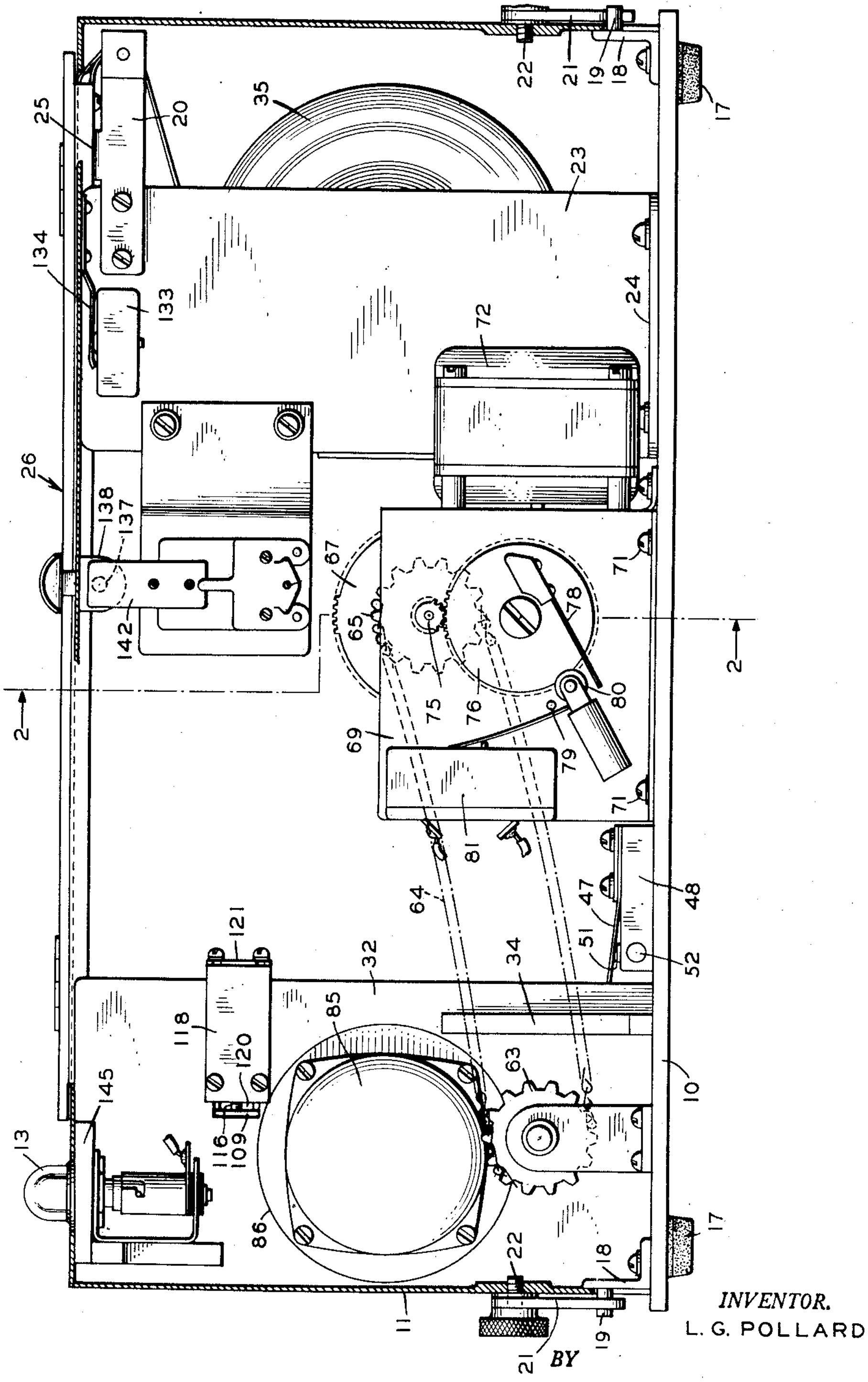
Fig. 3 is a right-side view of the machine, as seen in Fig. 2 with the side of the casing cut away.
Figure 4:
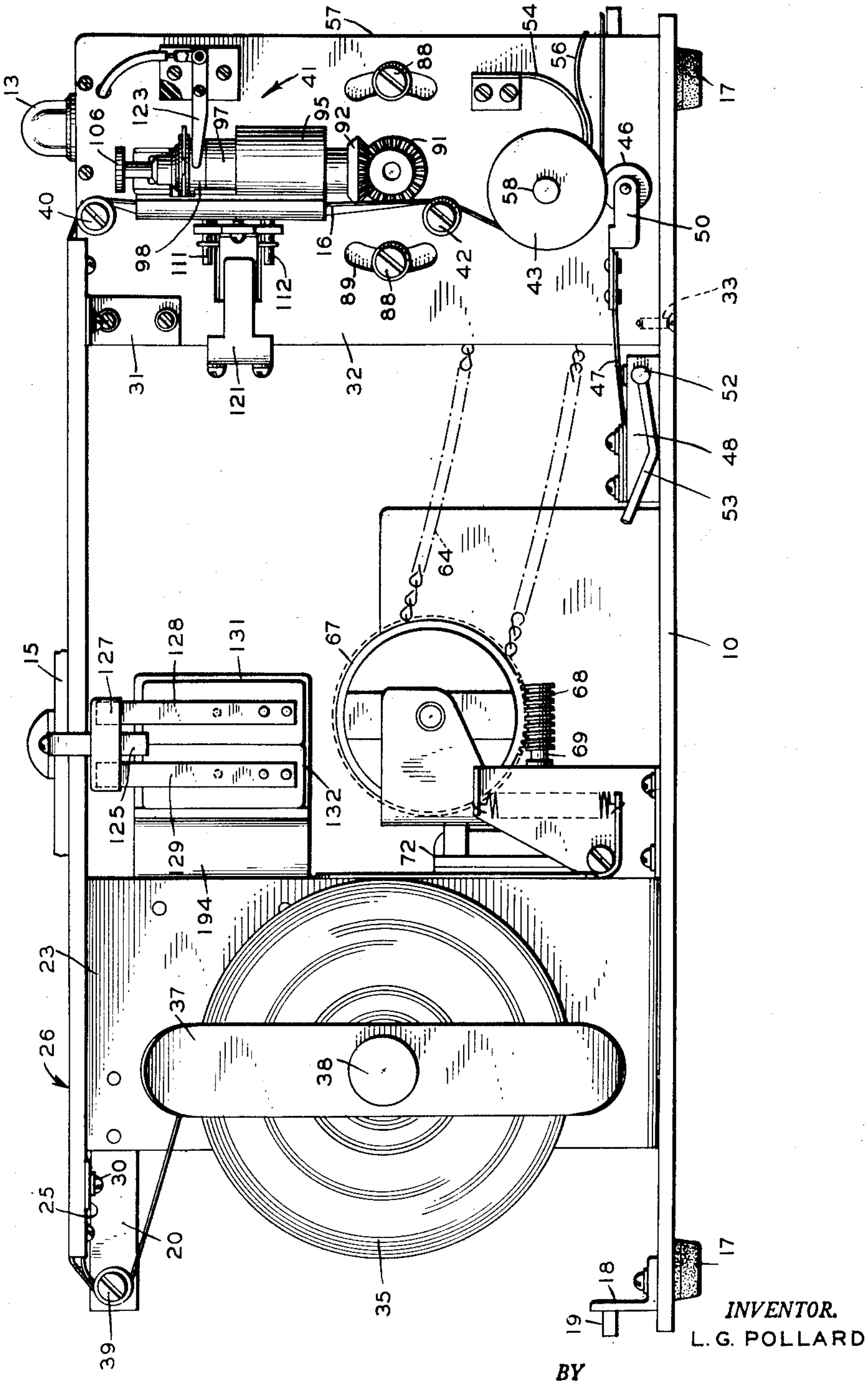
Fig. 4 is a similar left-side view of the machine as seen in Fig. 2.

The mechanism of the combined transmitter-recorder is shown in Figs. 2 through 7. Referring first to Fig. 3, the base plate 10 is shown provided with suitable feet 17 and at each end thereof the plate 10 carries a bracket 18 having a horizontal pin 19 adapted to be engaged by a latch member 21 pivoted upon a stud 22 threaded into the end members of the casing 11, thereby to lock the cover in position upon the base. Mounted upon the base plate 10, at the left-hand end thereof as seen in Fig. 4, is a vertical supporting plate 23 secured to the base 10 by means of screws extending through the horizontal flange 24 (Fig. 3). Secured to the upper end of the plate 23 is a bracket 20 having a horizontally turned portion 25 to which is secured one end of a horizontally extending tape guide 26. This guide consists of a thin-walled U-shaped trough 27 (Fig. 2), having inwardly extending tape guiding flanges 28 and disposed within the trough is a heavy base plate 29 secured to the trough by means of suitable screws 30, the plate 29 being disposed slightly below the flanges 28 to permit the passage of a paper tape therebetween. The opposite end of the tape guide 26 is supported upon a bracket 31 (Fig. 4) carried by a second vertical plate 32 disposed at the right-hand end of the machine, and secured to the base plate 10 by means of suitable screws 33 passing upwardly therethrough. A bracket 34 (Fig. 5) secured to the upright 32 and to the base plate 10 serves to reinforce the former.

Figure 5:
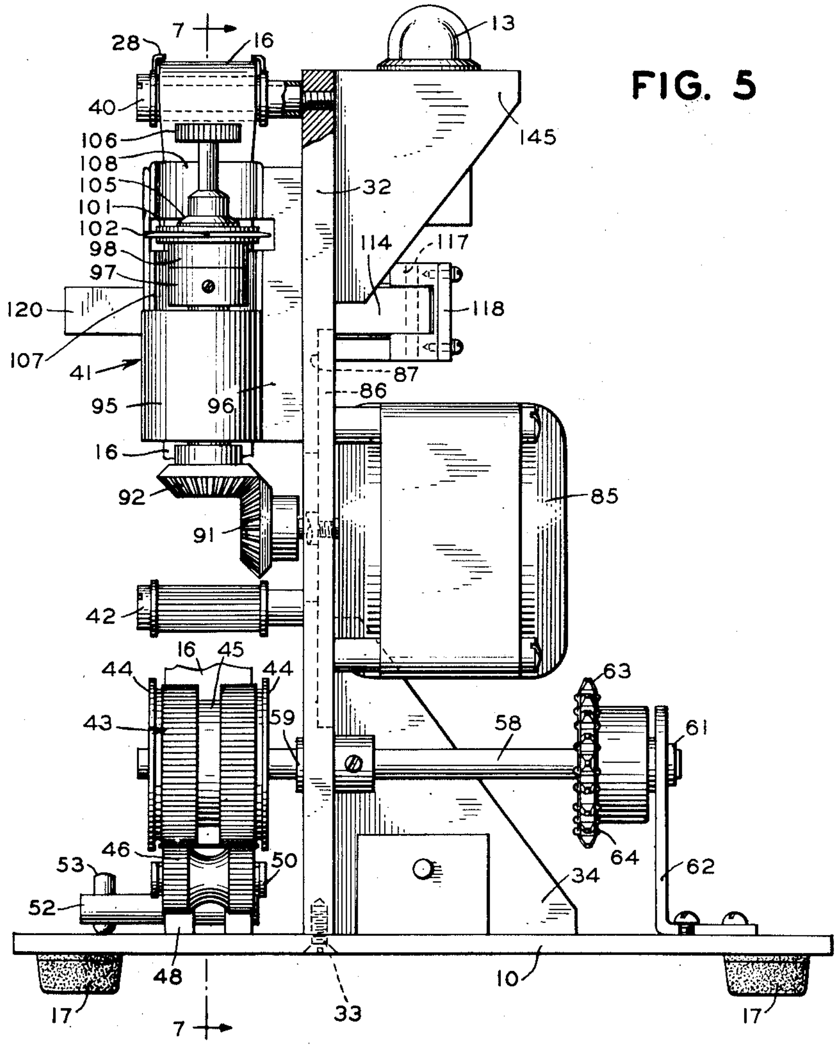
Fig. 5 is a right-end view of the machine, as seen in Fig. 4, with the casing removed.

A reel of tape 35 (Figs. 2 and 4) is arranged to be carried on a spindle 36 fixed to the upright plate 23, the reel being retained on the spindle by a retaining strip 37 secured in place by a knurled nut 38, threaded upon the reduced end (not shown) of the spindle 36. The tape is directed from the reel 35 over a roller 39 and onto the guide 26, which serves, as will hereinafter appear, as a table or support for the inscription of the message in pencil upon the tape for purposes of transmission. At the right end of the guide 26 (Fig. 4) the tape is directed over a second guide roller 40 past the scanning mechanism, indicated generally at 41, and thence over a second guide roller 42 and around a knurled feed roller 43. The feed roller 43, as shown in Fig. 5, has two outward guide flanges 44, and a central groove 45. The tape is held in contact with the feed roller by a knurled pressure roller 46 mounted in a forked carrier 50, secured to a leaf-spring 47, fastened upon a block 48 in turn secured to the base plate 10. The block 48 is cut away at its forward end to house a cam member 51 (Fig. 7) carried upon a shaft 52 provided with an operating lever 53, whereby the spring 47 either may be biased to force the pressure roller 46 into contact with the feed roller 43 or untensioned to permit the pressure to be released so as to separate the rollers 46 and 43 to permit the tape to be threaded therebetween. A stripping member 54 mounted upon the plate 32 comprises a narrow strip bent backward upon itself in the form of a V with the apex thereof disposed within the recess 45 of the feed roller, the lower arcuate portion 56 of this member serving to guide the tape outwardly through the opening 57 of the casing 11.

The feed roller 43 is fixed upon a shaft 58 (Fig. 5) carried in a bearing 59 in the vertical plate 32, and in a second bearing 61, carried by an upright bracket 62 secured to the base plate 10. It is driven by means of a sprocket wheel 63 fixed upon the shaft and meshing with a chain 64 which passes over a second sprocket wheel 65 (Figs. 2 and 3), carried upon a shaft 66, mounted in bearings 67 and 68 mounted in a housing bracket 69, secured to the base plate 10 through the horizontal flanges 71. Shaft 66 carries a gear 67' meshing with a worm 68 upon the shaft 66 of a feed motor 72. The motor 72 is mounted upon one side 73 of housing bracket 69 by means of screws 74.

A pinion 75 is fixed upon the outer end of the shaft 66 for engagement with a gear 76 carried on a stub shaft 77 in the right side of the bracket 69 (Fig. 2), the gear 76 carrying a leaf-spring member 78 adapted when the gear 76 is rotated counterclockwise, as seen in Fig. 3, to first engage a fixed pin 79 and upon slight further rotation to be flexed past the pin 79 to momentarily engage the roller operating member 80 of a switch 81. The gear ratio is such that the gear 76 makes one complete revolution for each cycle of the machine, operating either as a transmitter or a receiver, and corresponds to the advancement of the tape by the feed roller 43 a distance sufficient to transmit or record a complete message. When such movement of the tape has occurred the spring member 78 of the gear 76 actuates the switch 81 momentarily to release certain control relays, to be hereinafter described, to remove power from the machine and thus stop the operation thereof.

Figure 6:
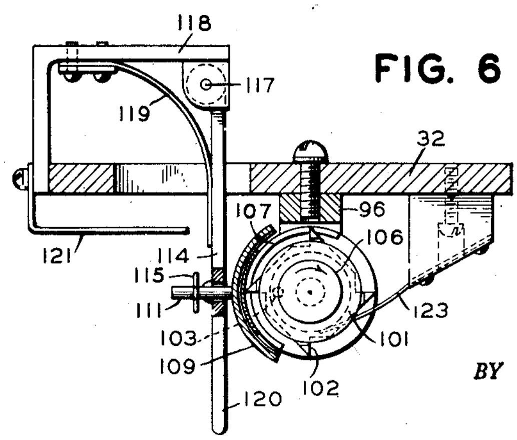
Fig. 6 is a horizontal sectional view on the line 6—6 of Fig. 7 showing the manner of scanning the tape by the multi-stylus disk.
Figure 7:
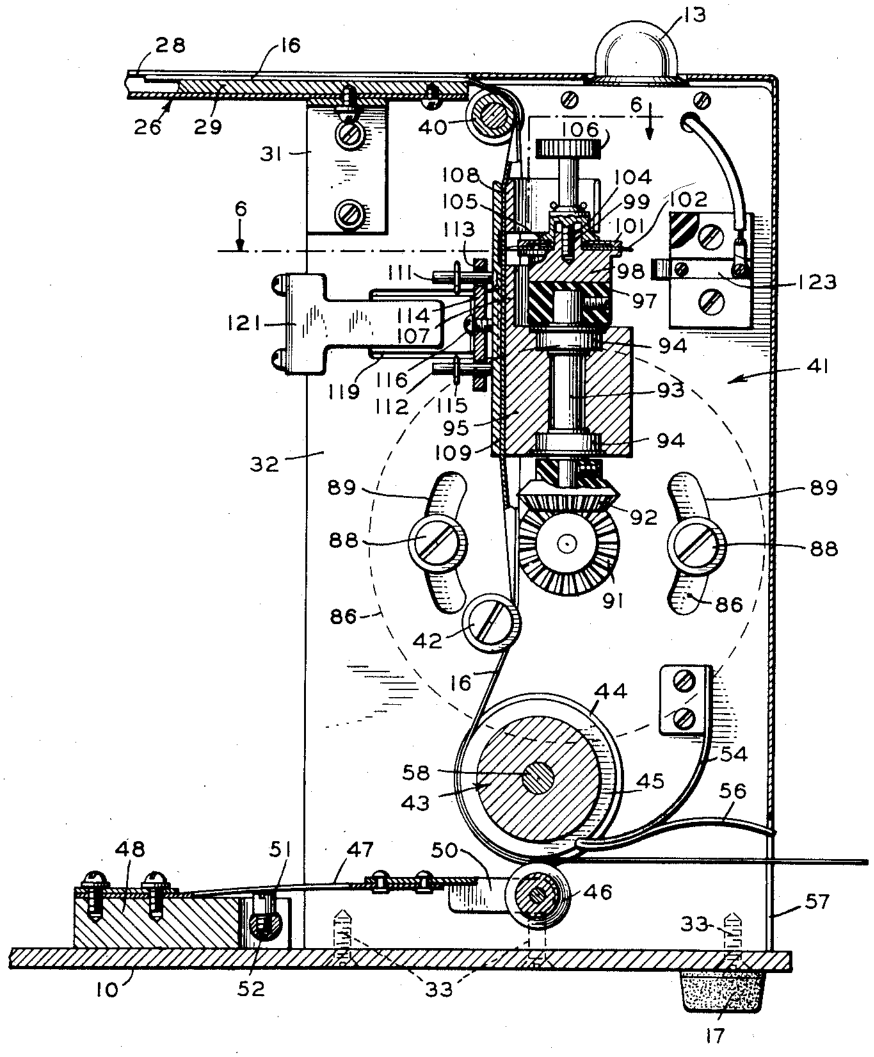
Fig. 7 is a vertical sectional view on the line 7—7 of Fig. 5.

The scanning mechanism indicated generally at 41 (Fig. 5), comprises a synchronous driving motor 85, mounted upon a circular plate 86 set within a circular recess 87 in the vertical plate 32 and held in place for rotation about its axis by bolts 88 (Fig. 7) passing through arcuate slots 89 in the plate 32. The motor shaft passes through the plate 32 and at its outer end carries a bevelled gear 91 which meshes with a second gear 92 secured upon the vertical shaft 93 disposed in bearings 94 in a cylindrical sleeve 95 secured to the plate 32 through a rectangular block 96 (Figs. 5 and 6). Secured to the upper end of the shaft 93 is a fiber disc 97 which serves as an insulating spacer for a stylus holder 98 secured thereto in any suitable manner. The holder 98 is cylindrical in shape and has a reduced hub portion 99 over which the stylus disk 101 fits. The disk 101 has four equally spaced stylus points 102 (Fig. 6) formed thereon although it is to be understood that the styli may be separate members from the disk 101 and carried thereby in any suitable manner. The disk 101 is oriented with respect to the holder 98 and shaft 93 by means of a pin 103 which extends upwardly from the holder 98 and passes through a hole in the stylus disk. The stylus disk is clamped to the holder 98 by means of a stud 104 (Fig. 7) threaded into the holder and having a clamping face 105 which engages the top surface of the stylus disk. A knurled knob 106 is provided for the stud to facilitate the securing and removal thereof.

In order to change the stylus when necessitated by wear, it is only necessary to remove the stud 104, lift off the stylus disk, replace it with another, and resecure the stud in place. The hole in the disk engaging with the pin 103 properly orients the new stylus disk with respect to the shaft 93 and hence with respect to the poles of the synchronous motor 85.

The mode of mounting the motor 85 permits the relative position of the poles with respect to the stylus points to be adjusted so that when two combined transmitter-receivers are operated from the same power source, the styli of both machines may be brought into the same phase relation with respect to the A. C. current power source.

As heretofore stated, the record tape is guided in an arcuate path past the stylus points. For this purpose the cylindrical block 95 has an arcuate extension 107 which terminates slightly below the stylus disk and serves with the main body of the block as a section of the arcuate tape guide. A second aligned arcuate member 108 secured to the block 96 is spaced at its lower end slightly above the stylus disk so that the stylus rotates within the gap between the members 107, 108. An arcuate backing plate 109 is also provided so that the tape in passing between the plate 109 and the members 107, 108 will be held in an arcuate path. The plate 109 is recessed at the zone of contact of the styli with the tape so that the tape will be pushed slightly into this recess by the stylus points as they rotate thereby insuring good electrical contact between the styli and the tape. The plate 109 is held in position by two pins 111, 112 secured to the back side thereof, which pass loosely through two apertures 113 in a pressure plate operating lever 114. Retaining clips 115 are provided for the pins 111, 112. An adjusting screw 116 threaded through the lever 114 forces the backing plate 109 against the members 107, 108. The lever 114 is pivoted at 117 (Fig. 6) to a bracket 118 secured to the upright plate 32 and the lever is biased towards the plate 109 by the flat spring 119. The purpose of this mounting for the backing plate 109 is to permit the same to be moved away from the members 107, 108 so that the tape may be manually threaded between these members when a new roll of tape is supplied to the machine. The backward movement of the lever 114 is effected manually by the extension 120 thereof and is limited by a stop member 121 secured to the upright plate 32.

Current is applied to the stylus disk either for marking the tape during reception of a message or for generation of signals during transmission, through a brush 123 which rides upon the periphery of the stylus holder 98. The current passes from the styli selectively through the tape, either in accordance with the markings thereon for transmission, or in accordance with the applied signals when operating as a receiver, to the backing plate 109 which is suitably grounded to complete the electrical circuit.

As previously stated, the operation of the combined transmitter-receiver is manually controlled by the manipulation of the cover 15 and for this purpose the cover has secured thereto a switch operating arm 125 (Fig. 2) which passes downwardly into the casing through an opening 126 in the top thereof. A crossarm 127 on the member 125 is positioned, when the cover is opened, so as to engage the operating members 128 and 129 (Fig. 4) of two microswitches 131 and 132 mounted upon a bracket 134 carried by the vertical supporting plate 23. Switch 128 is a two-position switch adapted to be operated to one of its two positions upon the opening of the cover 15, and switch 129 is a single position switch adapted to be moved to its closed position upon the opening of the cover 15.

A line switch 133 (Fig. 3) is mounted upon the vertical plate 23 in such position as to be engaged by an operating spring 134 carried by the underside of the top of casing 11 so as to be closed thereby when the casing is placed in position upon the base 10 and to be opened to remove all power from the machine when the casing is removed, as for instance, during the insertion of a new roll of tape, thereby eliminating the danger of electric shock to the attendant.

The cover 15 is adapted to be locked in its closed position during the period it is operating as a transmitter and during the period it is under seizure as a recorder, and for this purpose the cover operating member 125 has a depending latch 135 (Fig. 2), the notch 136 of which is adapted to be engaged by a locking bolt 137 loosely mounted in ears 138 of a bracket 139 carried by the top casing member. The bolt 137 is normally biased away from the latch 135 by a spring 141 and is adapted to be urged into the notch 136 of the latch by the leaf spring extension 142 attached to the armature of a magnet 143, the operation of which will be described in connection with the control circuits. Should the magnet 143 be energized during the time when the cover 15 is open, as occurs whenever the cover is opened for the inscription of a message upon the tape, the bolt 137 will be moved to the right against the force of the armature spring 142 upon the closing of the cover, by the cam face 144 of the lever 135 and will thereafter engage the notch 136 to lock the cover depressed.

The signal lamp 13 which protrudes through the casing is mounted upon a horizontal plate 145 secured to the upright plate 32, and serves to indicate either that the machine has been seized for reception or that transmission is in progress.

Figure 8:
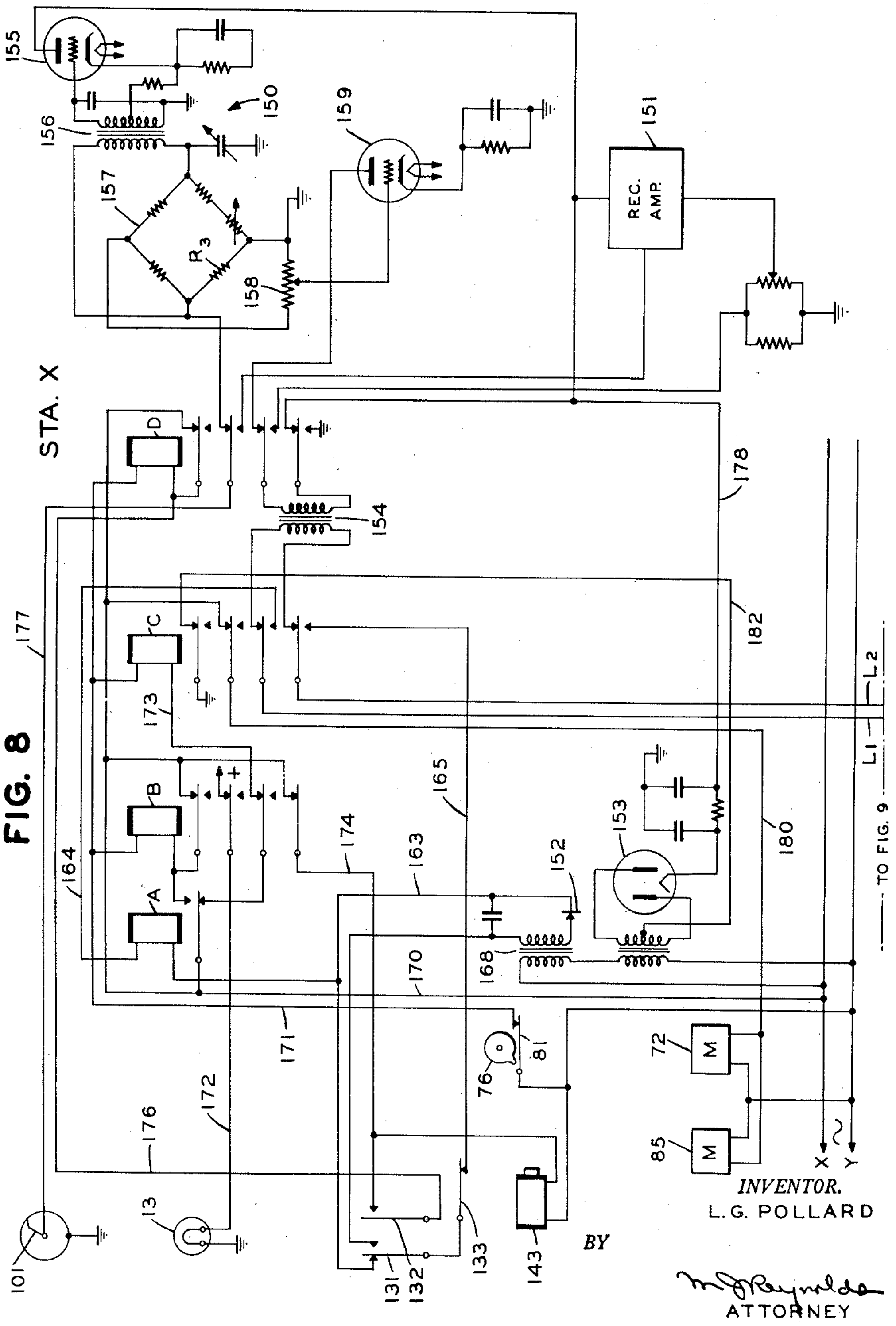
Fig. 8 is a circuit diagram showing the control circuits at each station in the position they assume when the station machine is serving as a transmitter.
Figure 9:
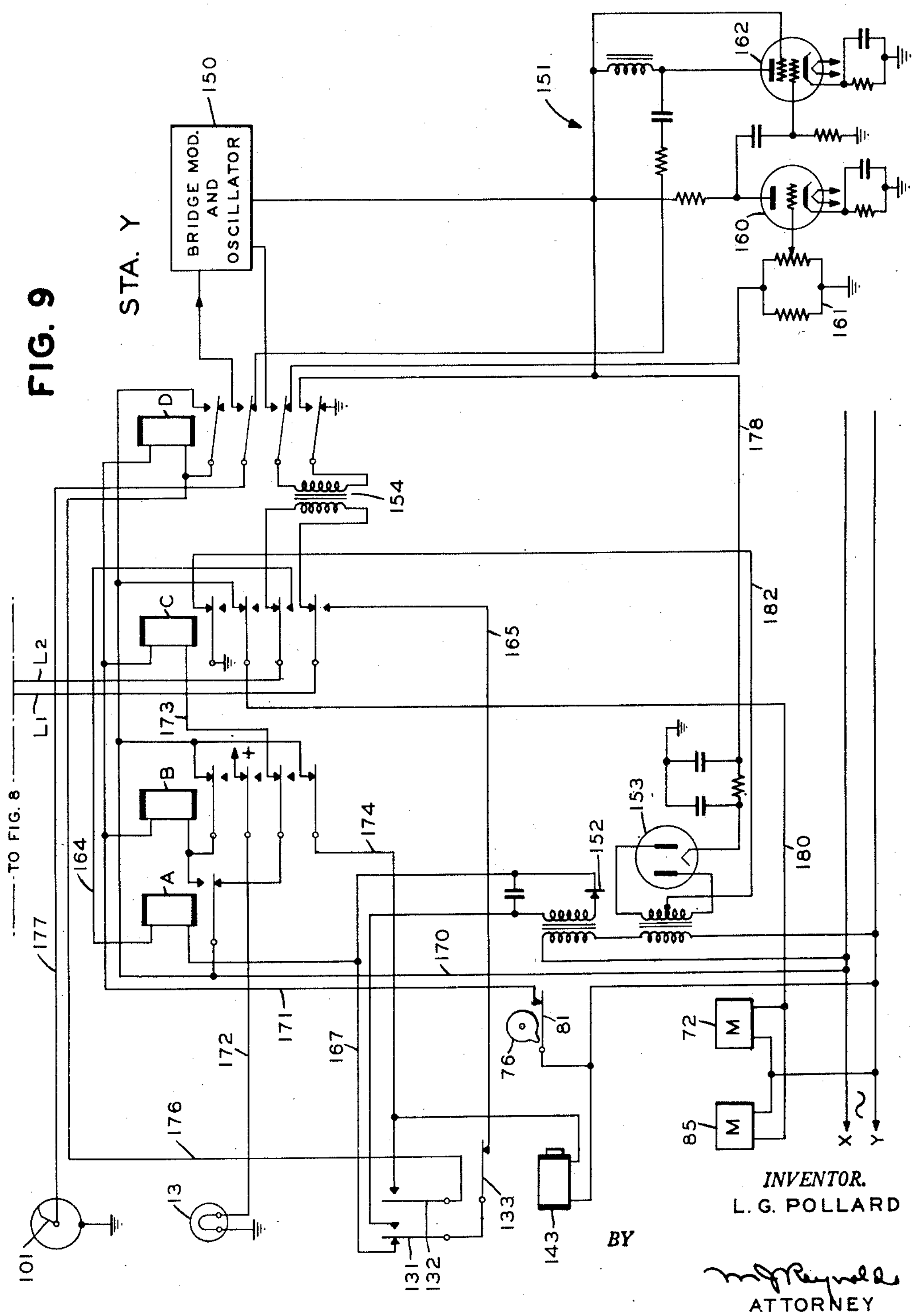
Fig. 9 is a similar circuit diagram showing the control circuits at each station in the position they assume when the station machine is serving as a recorder.

The control circuits for the operation of two facsimile transmitter-receivers over a line circuit are shown in Figs. 8 and 9. The circuit arrangements of Figs. 8 and 9 are identical with the exception that the relays A, B, C and D of Fig. 8 are shown in the position which they assume during transmission and the corresponding relays of Fig. 9 are in the position which they assume during reception. Further, the bridge modulator and oscillator indicated at 150 is illustrated by means of a block diagram in Fig. 9 since it is not used at this station during reception, and the receiver amplifier 151 is shown in block diagram in Fig. 8 since it does not enter into operation during transmission. Referring first to Fig. 8, the control circuits comprise in addition to the cover switches 131 and 132 and cam switch 81, the four control relays A, B, C and D, a single wave rectifier 152 inductively coupled to the alternating current source XY, the full wave rectifier 153, similarly coupled to the alternating current source and a line transformer 154. The oscillator and bridge modulator 150 comprises a three-element oscillator tube 155 coupled by a transformer 156 to the right and left apexes of a Wheatstone bridge 157, the opposite apexes of which are joined through the resistance 158, from which the grid of an amplifier tube 159 derives its potential. The stylus 101 of the transmitting machine is connected through the contacts of relay D, as will hereinafter appear, to ground in parallel with the ratio arm R3 of the bridge so as to vary the resistance of this arm in accordance with the conductivity of the transmitting tape, to unbalance the bridge 157 whereby to impress on the grid of the tube 159, potentials which vary with the conductive and nonconducting areas of the recording tape.

The equipment at station 9 is identical with that described above and this figure shows in addition the detailed arrangement of the receiving amplifier 151 which comprises a first stage amplifier tube 160 coupled to the right hand winding of the line transformer 154 through a high impedance 161. The output of the tube 160 is resistance coupled to a second stage amplifier 162, the output of which is connected to the receiving stylus 101 through the contacts of relay D as will hereinafter appear.

The arrangement of the circuits will best be understood by a detailed description of their operation. Assuming that the operator of the machine at station X (Fig. 8) desired to transmit a message to the operator at station Y (Fig. 9), he first raises the cover of his machine. This causes the cover switches 131 and 132 at station X to be moved to the right hand side. Switch 131 in this position completes a circuit from the output from the rectifier in 152 over conductor 163 through the winding of relay A, thence by conductor 164, break contact and lower middle armature of unoperated relay C and through line conductor L1. At station Y this circuit is completed from the line conductor L1 through the lowermost armature and break contact of unoperated relay C, thence by conductor 165 and safety switch 133 to the switch 131 and left hand contact thereof, and thence by conductor 167 and the winding of relay A at station Y to the break contact and lower middle armature of relay C to line L2, the circuit continuing from line L2 at station X through the lowermost armature and break contact of relay C and conductor 165 to switch 131 and through its right hand contact back through the secondary winding of the coupling transformer 168, completing the circuit. Direct current is thus caused to flow in a loop over the line circuit and through relays at each station. These relays thus become operated and in so doing operate relays B at each station, the circuits being identical and being completed from the X side of the alternating current power over conductor 170, armature and make contact of relay A, winding of relay B, conductor 171 and the normally closed contacts of the cam switch 81 to the Y side of the alternating current supply. Relays of each station upon operating lock up through their uppermost armature and make contact to the alternating current supply. Relay B at its upper middle armature and make contact completes an energizing circuit over conductor 172 for the signal lamp 13 at both machines. At the lower middle armature and make conductor, relay B at both stations prepares a circuit from the back contact of relay A through the lower middle armature and make contact of relay B, conductor 173 and winding of relay C to one side of the alternating current source. This circuit is not completed, however, at this time. Relay B at its lowermost contact completes a circuit from the X side of the power source, conductor 170, make contact and lowermost armature of relay B, conductor 174, and the winding of the latch magnet 143 to the Y side of the power source, this operating the cover latch magnet 143 at each station. At station Y, the magnet 143 latches the cover of the machine closed. At station X, the cover is open but the energization of its latch magnet serves to tension the bolt 137 towards the left, as heretofore described in connection with Fig. 2, so that the cover 15 becomes locked as soon as it is closed following the inscription of the message to be transmitted thereon. At station X, the relay D is also operated at this time over a circuit extending from the X side of the alternating current source through the make contact and lowermost armature of relay B, conductor 174, switch 132, conductor 176, winding of relay D, conductor 171 and the contacts of the cam switch 81 to the side of the power source. This relay D, however, does not operate at station Y for the reason that the switch 132 at that station remains on its left hand contact. At station X, relay D locks up through its uppermost armature and make contact. At its upper middle armature it connects the stylus 101 over conductor 177 through the left hand apex of the bridge 157. At the two lower armatures, relay D connects the right hand winding of the transformer 154 (serving as a primary winding) between the plate of the amplifier tube 159 and conductor 178 extending from the output side of the rectifier unit 153.

At station Y, relay D remains on its back contacts and in this position the stylus is connected by the conductor 177 through the upper middle armature and back contact of relay D to the plate of the amplifier 162. The right hand winding of the transformer 154 (serving as a secondary) is also connected at station Y through the lower two armatures of relay D between ground and the grid of the first amplifier tube 160 through the high impedance network 161.

The stylus motor 85 and the feed motor 72 at each station are deenergized at this time, the power circuit therefor extending from the Y side alternating current source through the motors in parallel and thence by a conductor 130 to the upper middle armature of relay C resting at this time on its back contact. The ground return for plate voltage applied to the oscillating tube 155 and amplifier tube 159 at station X is also open at the uppermost armature of relay C and likewise the ground return for the plate circuit of the amplifier tubes 160 and 162 of the receiving amplifier at station Y is also open at the upper armature of relay C at this station.

All of the above operations occurred as a result of the operator at station X opening the cover 15 of the machine preparatory to writing the desired message upon the transmitting tape. As soon as this message has been written the cover is manually closed thereby operating the cover switches 131 and 132 at station X to their left contacts. The opening of switch 132 does not modify the circuit arrangements, since relay D, which was operated therethrough, is now locked through its uppermost armature. Switch 131 on moving to the left, however, interrupts the direct current circuit through the line L1, L2 and hence through relay A at each station permitting these relays to deenergize. As the armature of relay A at each station falls back, it completes a circuit for relay C, at each station, this circuit being traced from the X side of the alternating current source through conductor 170, armature and back contact of relay A, make contact and lower middle armature of relay, conductor 173, winding of relay C and through the cam switch 81 to the Y side of the power source. Relay C at station X applies ground through its uppermost armature and conductor 182 to the midpoint of the transformer winding of the rectifier unit 153 thereby allowing current to flow in the plate circuit of the oscillator tube 155 and the amplifier tube 159 at the transmitting station. At station Y, plate current is similarly applied to the amplifying tubes 160 and 162. At the upper middle armature of relay C at each station, the circuit is completed to the side of the power source for the stylus motor 85 and feed motor 72, causing scanning to commence at both the transmitting and receiving stations. At the two lower armatures, relay C connects line conductors L1, L2 to the left winding of the line transformer 154. Stations X and Y have been shown with their relay contacts in the position which they assume at this time. The stylus circuit, therefore, extends from ground through the selectively conductive transmitting tape to the stylus 101 and thence by way of conductor 177 to the left apex of the bridge 157, this portion of the circuit being, as stated, in parallel with the ratio arm R3 of the bridge. The resistance to this arm is, therefore, varied in accordance with the conductivity of the transmitting tape as the various marking portions of the message are traversed by the stylus and thereby serves to modulate the output of the oscillator 155, the modulated carrier current being amplified by the tube 159 and conducted through the make contact and lower middle armature of relay D to the primary winding of transformer 154 and thence by the lower armature and make contact of relay D to the power supply 153. The signals induced in the secondary of the transformer 154 are conducted from the upper terminal thereof, through the lower middle armature and make contact of relay C to the line L1 and from the lower terminal thereof through the make contact and lower armature of relay C to line L2. These signals are continued at station Y through the two lowermost armatures of relay C and make contacts thereof to the left hand winding of transformer 154, serving as a primary winding, the opposite winding being connected between ground and the grid of the amplifier tube 160. The signals are amplified by tubes 160, 162 and then applied through the back contact and upper middle armature of relay D and conductor 177 to the stylus 101 of the recording machine, where they serve to mark the recording tape to produce a facsimile of the transmitted message.

Transmission thus continues until the gear 76 has completed a single revolution. This period is dependent upon the gear ratio of the gear train and is sufficient to permit the message written on the tape of the transmitter to completely pass the transmitting stylus and to permit the recorded message at station Y to have advanced beyond the recording stylus a sufficient distance to render it visible outside of the enclosing casing. As the gear 76 completes its revolution, the arm 77 thereon momentarily opens the cam switch 81, thereby at station X interrupting the locking circuits for the relays B and D and at station Y interrupting the locking circuit for relay B, relay D being unoperated at this station. Relay B at each station upon becoming deenergized opens the holding circuit for the latch magnet 143 and the relay C at each station. All of the relays A, B, C and D at each station are thus deenergized and the cover of both machines released, thus restoring both the transmitter and the receiver to normal and rendering them effective so that either may be operated again to transmit to the other.

The term "record medium" is used herein to refer to the dielectric coated conducting base medium whether employed for the transmission of messages or for the recording thereof.

While the writing support has been shown as disposed in a horizontal plane, it is obvious that its transverse dimension may be inclined to the horizontal, if desired, and the term "horizontally extending" as used in connection therewith in the claims refers only to the longitudinal dimension of the support.

What is claimed is:

1. A facsimile machine comprising a source of narrow recording tape, a scanning mechanism, an elongated substantially horizontally extending support, feed means and guiding means cooperating to advance said tape in a continuous path from said source, over said support and past said scanning mechanism, said elongated support serving as a table for writing a message lengthwise on the tape, means for initiating said scanning mechanism and feed means into operation, said feed means continuously advancing the tape lengthwise past said scanning mechanism during a scanning operation, and metering means controlled by said feed means for interrupting such operation after a predetermined length of said record tape has been advanced past said scanning mechanism.

2. A facsimile machine comprising a source of narrow recording tape, a scanning mechanism, an elongated substantially horizontally extending support, which serves as a table for writing a message lengthwise on the tape, feed means and guiding means cooperating to advance said tape in a continuous path from said source, over said support and past said scanning mechanism, means for initiating said feed means into operation to feed the tape lengthwise past said scanning mechanism during a scanning operation, and metering means controlled by said feed means for interrupting such operation after a predetermined cycle of operation thereof.

3. A facsimile machine comprising a source of narrow recording tape, a scanning mechanism, an elongated substantially horizontally extending support, feed means and guiding means cooperating to advance said tape from said source, over said support and past said scanning mechanism, an enclosing casing for said machine having in one face thereof an elongated opening substantially coextensive with said support whereby messages may be inscribed lengthwise upon the tape supported thereon, and means for initiating said scanning mechanism and feed means into operation to scan the message inscribed on said medium, said feed means continuously advancing the tape lengthwise past said scanning mechanism during a scanning operation.

4. A facsimile machine comprising a source of narrow recording tape, a scanning mechanism, an elongated substantially horizontally extending support, feed means and guiding means cooperating to advance said medium from said source, over said support and past said scanning mechanism, an enclosing casing for said machine having in one face thereof an elongated opening substantially coextensive with said support whereby messages may be inscribed lengthwise upon the tape supported thereon, means for initiating said scanning mechanism and feed means into operation to scan the message inscribed on said tape, said feed means continuously advancing the tape lengthwise past said scanning mechanism during a scanning operation, and metering means controlled by said feeding means for interrupting the operation of said scanning mechanism and feeding means after a predetermined length of said record tape has been advanced past said scanning mechanism.

5. A facsimile machine comprising a source of record medium, a scanning mechanism, an elongated substantially horizontally extending support, feed means and guiding means cooperating to advance said medium from said source, over said support and past said scanning mechanism, an enclosing casing for said machine having in one face thereof an elongated opening adjacent said support, a normally closed cover for said opening, said cover when opened giving access to said support for inscribing messages upon the record medium supported thereon, and means controlled by the operation of said cover for initiating said scanning mechanism and feed means into operation to scan the message inscribed on said medium.

6. A facsimile machine comprising a source of record medium, a scanning mechanism, an elongated substantially horizontally extending support, feed means and guiding means cooperating to advance said medium from said source, over said support and past said scanning mechanism, an enclosing casing for said machine having in one face thereof an elongated opening adjacent said support, a normally closed cover for said opening, said cover when opened giving access to said support for inscribing messages upon the record medium supported thereon, means controlled by said cover in open position for preventing the operation of said scanning mechanism and feed means, and means controlled by said cover upon closure thereof for initiating the operation of said scanning mechanism and feed means to scan the message inscribed on said medium.

7. A facsimile machine comprising a source of record medium, a scanning mechanism, an elongated substantially horizontally extending support, feed means and guiding means cooperating to advance said medium from said source, over said support and past said scanning mechanism, an enclosing casing for said machine having in one face thereof an elongated opening adjacent said support, a normally closed cover for said opening, said cover when opened giving access to said support for inscribing messages upon the record medium supported thereon, means for initiating said scanning mechanism and feed means into operation to scan the message inscribed on said medium, means for locking said cover in closed position during the operation of said feed means and scanning mechanism, and means for automatically unlocking the closed cover at the end of a scanning operation.

8. A facsimile machine comprising a narrow record tape, a flat writing support for said tape on which messages are written lengthwise thereof, a scanning mechanism, feed means for advancing the tape lengthwise over said writing support and past said scanning mechanism during a scanning operation, arcuate guide means for said tape to hold the same trough-shaped in the direction of its length as it moves past said scanning mechanism, said scanning mechanism including a rotatable stylus adapted to engage the arcuate surface of said tape, and means for operating said tape feed means and for rotating said stylus in unison.

9. A facsimile machine comprising a narrow record tape, a flat writing support for said tape on which messages are written lengthwise thereof, a scanning mechanism, feed means for advancing the tape lengthwise over said writing support and past said scanning mechanism during a scanning operation, arcuate guide means for said tape to hold the same trough-shaped in the direction of its length as it moves past said scanning mechanism, said scanning mechanism including a rotatable stylus adapted to engage the arcuate surface of said tape, means for starting the operation of said feed means and scanning mechanism, and metering means for automatically interrupting the operation of said feed means and scanning mechanism after a predetermined length of said record tape has been advanced past said stylus.

10. In a facsimile machine, a source of record tape, means for moving said tape through a predetermined path, means engageable with said tape in the path of movement thereof for curving the same into an arcuate form transversely thereof, a scanning mechanism including a synchronous motor, a rotatable shaft driven by said motor, a stylus support carried by said shaft, a disk detachably secured to said support and carrying a stylus for rotation into engagement with the arcuate surface of said tape, means for predetermining the radial position of said disk on its support so as to index said stylus relative to said support, and an adjustable mounting means for said motor arranged to permit rotation of said motor relative to said indexing means whereby said stylus may be phased relative to said tape and the poles of said motor.

11. In a facsimile machine, a source of record tape, means for feeding and guiding said tape in an arcuate path, a scanning mechanism including a motor, a rotatable shaft, driven by said motor, a stylus support carried by said shaft and a stylus carrier detachably secured to said support for rotation by said member, said stylus carrier comprising a disk provided with a plurality of stylus points, and manual means for releasably clamping said disk on said support, said plate and said support having interengaging means whereby said stylus carrier will be secured in predetermined angular relationship to said support.

12. In a facsimile machine, a source of record tape, means for moving said tape through a predetermined path, means engageable with said tape in the path of movement thereof for curving the same into an arcuate form transversely thereof, said last means comprising a pair of arcuate nested plates adapted to engage the opposite surfaces of said tape, and a stylus rotatable in the path of movement of said tape and engageable with the concave surface thereof, the arcuate plate engageable with the convex side of said tape having a recess therein in the path of rotation of said stylus, whereby said tape may be yieldably pressed into said recess by engagement of said stylus therewith.

13. In a facsimile machine, a source of record tape, means for moving said tape through a predetermined path, guide means engageable with said tape in the path of movement thereof for curving the same into an arcuate form transversely thereof, said last means comprising a pair of arcuate nested plates adapted to engage the opposite surfaces of said tape, a stylus rotatable in the path of movement of said tape and engageable with the concave surface thereof, the arcuate plate engageable with the convex side of said tape having a recess therein in the path of rotation of said stylus, whereby said tape may be yieldably pressed into said recess by engagement of said stylus therewith, means for insulating said stylus from said guide means and means for applying an electrical potential to said stylus.

14. In a facsimile communication system, a plurality of combined facsimile transmitters and receivers, each comprising a support for a supply of record tape, a writing support beneath a predetermined exposed length of said tape for permitting a message to be written thereon, a normally unlocked cover for said writing support to render the same accessible, scanning mechanism, means for feeding said tape over said support past said scanning mechanism, a line circuit connecting said combined transmitting and receiving machines, means controlled by the open cover of a machine for automatically conditioning that machine as a transmitting machine, means for controlling the conditioning of another of said machines as a receiving machine, said last means being automatically controlled from said transmitting machine over said line circuit, means for starting said conditioned machines into operation simultaneously, means at said transmitting machine including said scanning mechanism for generating facsimile signals from said tape and means at said receiving machine including said scanning mechanism responsive to said signals for marking the tape in accordance therewith.

15. In a facsimile machine using a recording tape, a rotary stylus scanner comprising an insulated metal disk provided on its periphery with a plurality of stylus points equidistantly spaced, means for supporting the tape for lengthwise movement past said disk in such position that said stylus points sweep transversely across the moving tape, said supporting means including an arcuate plate mounted in position to hold the tape in shape for transverse scanning, and manually operable means for moving said plate away from said scanner to permit the insertion of new tape into the space between the plate and scanner.

16. In a facsimile machine using a recording tape, a stationary block provided at one side with an arcuate surface, a rotary shaft mounted in said block and connected at one end to a source of power, an insulated scanning head fixed on the other end of said shaft, a stylus carrying disk replaceably mounted on said head, an arcuate plate adjustably supported adjacent to said arcuate surface on the block to provide an arcuate channel for the tape which is thereby supported in transversely curved shape concentric with said rotary stylus disk, means for feeding the tape through said channel during a scanning operation, and means for manually moving said plate away from the block to permit threading of new tape through said channel.

17. In a facsimile machine using a recording tape, scanning mechanism comprising a stationary block provided at one side with an arcuate surface, an arcuate plate mounted adjacent to said surface to form therewith a narrow arcuate channel through which said tape passes for scanning, said channel holding the tape transversely curved in the direction of its length, means for supporting said arcuate plate for slidable movement toward and away from the arcuate surface on said block, spring means for normally holding said plate in pressure contact with the tape as it passes through said channel, and a stylus rotatably supported by said block to scan the transversely curved surface of the tape.

18. In a facsimile machine using a recording tape, stylus scanning mechanism comprising a stationary block, a rotary shaft mounted in said block and connected at one end to a source of power, an insulated metal head secured to the other end of said shaft, a scanning disk mounted on said head and provided with a plurality of peripheral stylus points, a fastening device having a screw-threaded engagement with said head for clamping said stylus disk to the head, a fingerpiece on said device for easy removal and replacement of a stylus disk, and means providing an arcuate channel along said block for supporting a length of tape in scanning relation to said stylus disk.

19. In a facsimile machine using a recording tape, means for supporting a section of said tape horizontally for writing a message thereon lengthwise of the tape, a fixed cylindrical block supported in vertical position, means for guiding the tape downward from horizontal to vertical position past said cylindrical block which is provided with arcuate means to hold the vertical tape transversely curved in the direction of its length, a vertical shaft rotatably mounted in said block, a stylus fixed on the upper end of said shaft to rotate in a horizontal plane and scan the vertical arcuate portion of the tape, a vertical support, a synchronous motor mounted in horizontal position on said vertical support, a gear connection between said motor and said vertical shaft for rotating the stylus at scanning speed, and means for rotatably adjusting the motor on said support relative to said stylus, whereby the stylus may be phased in relation to the tape and the poles of said motor.

20. In a facsimile system, a pair of similar machines operatively connected over a line circuit, each machine being constructed to operate as a transmitter and as a receiver by means of electric scanning mechanism which operates on a continuous recording tape, a casing for each machine, said casing having a slot to expose a length of tape for writing a message thereon, a cover for said slot, and means whereby the machine whose cover is first opened is automatically set up as a transmitter while the other machine is simultaneously set up as a receiver, said automatic setting-up means including control relays automatically operated in response to the open position of the cover to condition the scanning mechanism of the open-cover machine for transmitting and condition the scanning mechanism of the closed-cover machine for recording.

21. In a facsimile system, a pair of similar machines operatively connected over a line circuit, each machine being constructed to operate as a transmitter and as a receiver by means of electric scanning mechanism which operates on a continuous recording tape, a casing for each machine, said casing having a slot to expose a length of tape for writing a message thereon, a cover for said slot, normally inoperative locking means for said cover to permit opening thereof for access to the tape when the machine is to be used as a transmitter, means whereby opening the cover of either machine automatically locks the cover of the other machine in closed position, and means controlled by the closed cover of said other machine for causing the same to operate as a recorder.

22. In a facsimile system, a pair of similar machines operatively connected over a line circuit, each machine being constructed to operate as a transmitter and as a receiver by means of electric scanning mechanism which operates on a continuous recording tape, a casing for each machine, said casing having a slot to expose a length of tape for writing a message thereon, a cover for said slot, normally inoperative locking means for said cover to permit opening thereof for access to the tape, means whereby opening the cover of either machine automatically locks the cover of the other machine in closed position, and control relays automatically responsive to the opening of said cover to set up the first machine as a transmitter and simultaneously set up the other machine as a receiver.

23. In a facsimile system, a pair of similar machines operatively connected over a line circuit, each machine being constructed to operate as a transmitter and as a receiver by means of electric scanning mechanism which operates on a continuous recording tape, a casing for each machine, said casing having a slot to expose a length of tape for writing a message thereon, a cover for said slot, means whereby the machine whose cover is first opened is automatically set up as a transmitter while the other machine is simultaneously set up as a receiver, said automatic setting-up means including control relays automatically operated in response to the open position of the cover, and means whereby the closing of the open cover automatically energizes the scanning mechanism of each machine.

24. In a facsimile system, a pair of transceivers adapted to be operatively connected, each machine being provided with apparatus which operates on a continuous tape for transmitting and recording, a casing for each machine adapted to enclose the apparatus thereof, said casing having a slot arranged to expose a length of tape for writing a message thereon, a normally closed cover for said slot, means whereby the closed position of said cover places the apparatus in condition to record, and circuit connections responsive to the opening of the cover of either machine for automatically placing that machine in condition to transmit.

25. In a facsimile system, a pair of transceivers adapted to be operatively connected, each machine having a transmitting amplifier and a recording amplifier, a scanning stylus in each machine adapted to operate on a continuous tape for transmitting and recording, a casing for each machine, said casing having a slot which exposes a length of tape for writing a message thereon, a normally closed cover for said slot, circuit connections whereby the closed cover connects the stylus to one of said amplifiers, and means responsive to the opening of the cover for connecting the stylus to the other amplifier.

26. In a facsimile system, a pair of similar machines adapted to be operatively connected, each machine being provided with apparatus adapted to set the machine up as a transmitter and as a recorder, said apparatus including an electric stylus which operates on a continuous tape for transmitting and recording, a casing adapted to enclose the apparatus of each machine, said casing being provided with a slot arranged to expose a length of tape for writing a message thereon, a normally closed cover for said slot, means whereby the closed position of said cover places the stylus in recording position, and circuit connections responsive to the opening of said cover for automatically placing the stylus of that machine in condition to transmit the message on the tape.

27. In a facsimile system, a pair of transceivers adapted to be operatively connected, each machine being provided with scanning mechanism which operates on a continuous tape for transmitting and recording, a casing for each machine, said casing having a slot to expose a length of tape for writing a message thereon, a normally closed cover for said slot, and means responsive to the opening of the cover of either machine for automatically locking the cover of the other machine in closed position.

28. In a facsimile system, a pair of transceivers adapted to be operatively connected, each machine having a casing provided with a slot which exposes a length of tape for writing a message thereon, a normally closed cover for said slot, normally inoperative locking means for said cover to permit the opening thereof for access to the tape, a magnet adapted when energized to operate said locking means into cover locking position, and means responsive to the opening of the cover of either machine for energizing the magnet of the other machine so as to lock the cover of said other machine in closed position and thereby prevent its use as a transmitter.

29. In a facsimile system, a pair of transceivers adapted to be operatively connected, electric scanning mechanism for each machine constructed to operate on a continuous tape for transmitting and recording, each machine being provided with a transmitting amplifier and a recording amplifier, a casing enclosing the apparatus of each machine, said casing having a slot arranged to expose a length of tape for writing a message thereon, a cover for said slot adapted to be manually opened and closed, switch means automatically operated when the cover is opened, a relay in each machine normally unenergized to connect the scanning mechanism to said recording amplifier, so that each machine is normally set up as a receiver, circuit connections controlled by said switch means to energize said relay when the cover of either machine is opened, and means responsive to the energizing of said relay to connect the scanning mechanism of the machine with the opened cover to said transmitting amplifier, whereby the machine whose cover is first opened is automatically set up as a transmitter while the other machine remains in condition to operate as a receiver.

LEON G. POLLARD.

REFERENCES CITED

The following references are of record in the file of this patent:

UNITED STATES PATENTS

| Number | Name | Date |
|---|---|---|
| 1,875,063 | Ludenia et al. | Aug. 30, 1932 |
| 1,902,486 | Butler | Mar. 21, 1933 |
| 2,038,375 | Mathes | Apr. 21, 1936 |
| 2,374,704 | Ridings | May 1, 1945 |
| 2,391,912 | Magee | Jan. 1, 1946 |
| 2,435,250 | Tandler | Feb. 3, 1948 |
| 2,477,062 | Jacobi | July 26, 1949 |